US006782371B2

(12) United States Patent
Thompson et al.

(10) Patent No.: US 6,782,371 B2
(45) Date of Patent: Aug. 24, 2004

(54) SYSTEM AND METHOD FOR MONITORING IRREGULAR SALES ACTIVITY

(75) Inventors: Bobby Thompson, Lynchburg, VA (US); Julie Drago, Lynchburg, VA (US); Trina Carter, Goode, VA (US)

(73) Assignee: GE Financial Assurance Holdings, Inc., Richmond, VA (US)

( * ) Notice: Subject to any disclaimer, the term of this patent is extended or adjusted under 35 U.S.C. 154(b) by 239 days.

(21) Appl. No.: 09/956,105

(22) Filed: Sep. 20, 2001

(65) Prior Publication Data

US 2003/0055714 A1 Mar. 20, 2003

(51) Int. Cl.⁷ .............................................. G06F 17/60
(52) U.S. Cl. ...................................................... 705/10
(58) Field of Search .................. 705/10, 2, 3

(56) References Cited

U.S. PATENT DOCUMENTS

| | | | | |
|---|---|---|---|---|
| 5,253,164 A | * | 10/1993 | Holloway et al. | 705/2 |
| 6,163,604 A | * | 12/2000 | Baulier et al. | 379/189 |
| 6,212,266 B1 | * | 4/2001 | Busuioc | 379/189 |
| 6,253,186 B1 | * | 6/2001 | Pendleton, Jr. | 705/2 |

FOREIGN PATENT DOCUMENTS

WO      WO 97/00483    *    1/1997   .......... G06F/17/60

OTHER PUBLICATIONS

Harker et al. "The best defense..." Health Systems Review, Nov./Dec. 1997 [Dialog].*
Mancino et al. "The auditor and fraud," Journal of Accountancy, Apr. 1997 [Dialog].*
Guy, Dan. C. Wayne Alderman, Alan Winters. "Auditing". Second Edition. Harcourt Brace Janovich Publishers. 1961–1988.*
Hermanson, Roger. James Edwards, R.F. Salmsonson. "Accounting Principles." Fourth Edition. Richard D. Irwin, Inc. 1989.*

* cited by examiner

*Primary Examiner*—Tariq R. Hapiz
*Assistant Examiner*—Catherine M. Colón
(74) *Attorney, Agent, or Firm*—Hunton & Williams LLP

(57) ABSTRACT

A system and method for identifying irregular sales activity. The method includes the steps of extracting data related to a first predetermined criteria from at least one of a predetermined set of files based on a first guideline; generating a first criteria specific report based on the first predetermined criteria; extracting data related to a second predetermined criteria from at least one of the predetermined set of files based on a second guideline; generating a second criteria specific report based on the second predetermined criteria; and generating an intermediate report including information from the criteria specific reports and generating an irregular activity report. The first criteria specific report includes data related to the first predetermined criteria associated with one or more entities of at least one predetermined entity type. The second criteria specific report includes data related to the second predetermined criteria associated with the one or more entities. The irregular sales activity report may include a score for each criteria, a total score for each entity based on percentage of activity not placed, number of policies, and other weighted factors and lists all of the entities or those entities having a total score greater than a selected irregular sales activity signaling score.

45 Claims, 3 Drawing Sheets

SYSTEM AND METHOD FOR MONITORING IRREGULAR SALES ACTIVITY

BACKGROUND OF THE INVENTION

Many companies only monitor sales activities of their sales representatives in an ad hoc manner, if at all. In companies having a large volume of sales or large numbers of independent sales representatives, it may be difficult to track irregular and fraudulent sales activity. A company may become aware of irregular or suspicious sales activity by word of mouth, such as a customer complaint or reports by employees who become aware of a problem. In other instances, the company may not know of irregular sales activity until an official complaint has been filed with, or an investigation is commenced by, a government regulatory entity. For example, an insurance company may not be aware of a problem with a sales agent until the state insurance department reports a complaint to the insurance company.

Another way companies may learn of sales irregularities is through customer surveys. However, customer surveys may not be completed or returned by all customers. Also, the problems may not become evident from the customer surveys quickly enough. The customer surveys may also be costly due to distribution costs, while not providing enough feedback to allow effective tracking of irregular sales activity.

Thus, a company may not learn of many cases of irregular sales activity. If the company does learn of the irregular sales activity, the company may nevertheless not be alerted to the problem soon enough to effectively deal with the problem.

There is a need for a systematic means for a company to monitor irregular sales activities and to alert the company at an early time if problems exist.

BRIEF SUMMARY OF THE INVENTION

The invention includes a system and a method for identifying irregular sales activity. In one embodiment, the method includes the steps of extracting data related to a first predetermined criteria from at least one of a predetermined set of files based on a first guideline; generating a first criteria specific report based on the first predetermined criteria; extracting data related to a second predetermined criteria from at least one of the predetermined set of files based on a second guideline; generating a second criteria specific report based on the second predetermined criteria; generating an intermediate report including information from the criteria specific reports; and generating an irregular sales activity report.

The first criteria specific report includes data related to the first predetermined criteria associated with one or more entities of at least one predetermined entity type. The second criteria specific report includes data related to the second predetermined criteria associated with the one or more entities.

The intermediate report organizes and combines the data of the criteria by entity.

The irregular sales activity report may compute the criteria scores and a total score based on the criteria scores using a predetermined totaling formula. The irregular sales activity report may list all of the entities having a total score greater than a selected irregular sales activity signaling score.

DETAILED DESCRIPTION OF THE INVENTION

Figure 1:
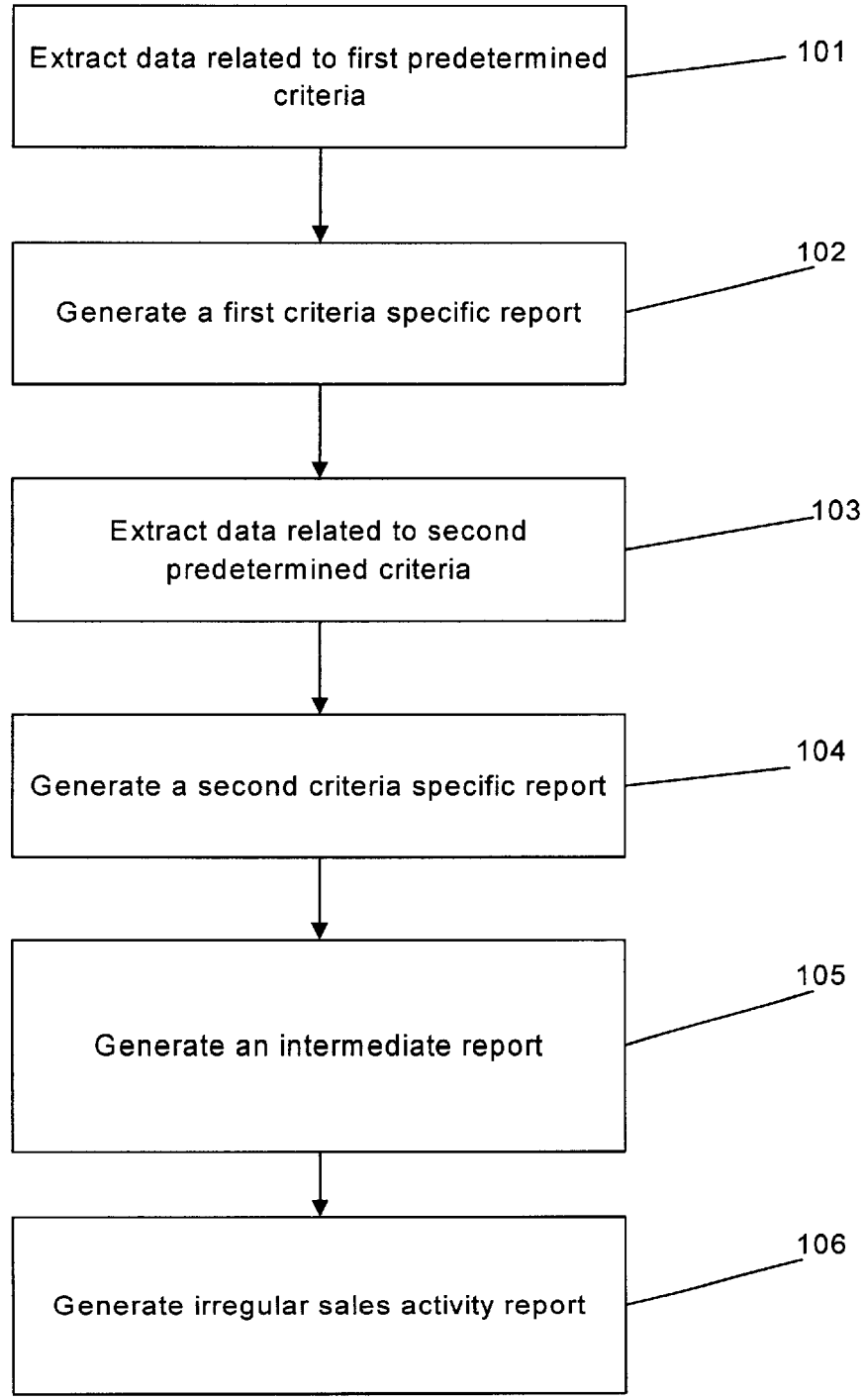
FIG. 1 is a flow diagram illustrating one embodiment of a method for identifying irregular sales activity.

FIG. 1 is a flow diagram illustrating the steps conducted in one embodiment of a method 100 for monitoring irregular sales activity. At step 101, data related to a first predetermined criteria may be extracted from a set of files based on a first guideline. The set of files may be a predetermined set of files, including data related to a sale or other activities of a sales agent. In one embodiment, the predetermined set of files may include insurance policy related data.

In the context of an insurance environment, criteria may include a risk factor used in assessing irregular sales activity in an insurance company. The risk factors used as criteria may include, for example, placement, persistency, internal replacement, external replacement, product mix and customer age. A guideline may include a requirement that has to be met, for example, a requirement that has to be met within a specific timeframe.

The first predetermined criteria may include a placement of insurance policies criteria. The first guideline may include extracting files based on a last change date where the last change date of the files must be within a first predetermined time period. The first predetermined time period may be selected by a system administrator or other user. The first predetermined time period may be any appropriate time period. For example, the first predetermined time period may be a one year time frame.

The last change date may vary, depending on a file or a file type. For example, the last change date for a first type of insurance file may be a date of the most recent change. The last change date for a second type of insurance file may be the final status date. For a third type of file, the last change date may include a date of change of at least one of a status, a location, or a change in a specific form or a screen of a computer data file. The changes in a specific form may include changes to at least one of a contract status, a plan code, an amount considered, a contract date, an issue date, a reissue date, a paid for date, a transaction date, an application state or an owner state.

The irregular sales activity monitoring system may generate criteria specific reports. All criteria reports can be broken out by many different factors, if so chosen. For example, the criteria reports can be broken down into two reports, a first report for worksite businesses and a second report for non-worksite businesses.

At step 102, the irregular sales activity monitoring system may generate a first criteria specific report. For example, if the first criteria is a placement criteria, such as a placement of insurance policies criteria, the first criteria specific report may be a placement report and the first criteria score may be a placement score. In one embodiment, the placement report may generate a list of factors for each entity of an entity type.

An entity may include a predetermined item on which the irregular sales activity monitoring system is reporting. For monitoring irregular sales activity for insurance sales agents, the entity type may include an agent, a general agent or a product. The entities of the entity type would include individual agents, individual general agents and specific products, respectively. The factors may include a number of policies placed factor, a number of policies not placed factor, a total number of policies factor, a percentage of policies place factor, a percentage of policies not placed factor, and a placement score.

In one embodiment, policies may be considered placed if they achieve a paid for status or an issued status. Some policies may be considered "placed" if they are issued and in force. Policies may be considered "not placed" when they are declined, deleted, or "Not Taken Offers" ("NTOs"). An NTO occurs when a policy is issued and the client then chooses not to accept the offer. Policies "not placed" may also include rejected policies or cancelled policies. Exclusions from the group of policies designated "placed" or "not placed" may include policies that are pending or reissued.

A percentage of policies "placed" may be calculated by dividing the number of policies placed by the total number of policies. A percentage of policies "not placed" may be calculated by dividing the number of policies not placed by the total number of policies. A placement score may be calculated based on percentage not placed, number of policies, and certain weighting factors. (The scores are calculated in the irregular sales activity report.) A report and a file may be created using the factors described above as fields. The data in the file may be viewable or not viewable.

At step 103, the irregular sales activity monitoring system may extract data related to a second predetermined criteria from at least one of the predetermined set of files based on a second guideline. The second predetermined criteria may include a persistency of accounts criteria. Accounts may include policies or contracts, such as, for example, insurance policies, annuity contracts, etc. In one embodiment, the second predetermined criteria may include a persistency of insurance policies criteria. The second guideline may include a guideline for retrieving data related to the second predetermined criteria within a three-year time period based on a policy date for each of the policies in the predetermined set of files.

At step 104, the irregular sales activity monitoring system may generate a second criteria specific report. The second criteria specific report may include a persistency report and the second criteria score may be a persistency score.

The persistency report may include, for each entity, a list of factors related to persistency. The list of factors may include a number of policies in force factor, a number of policies not in force factor, a total number of policies factor, a percentage of policies in force factor, a percentage of policies not in force factor.

Policies considered "in force" may include policies where a premium is paid and policies considered active, disabled or waiting initial payment. Policies considered "not in force" may include policies that are terminated, surrendered, lapsed, paid up, matured, expired or cancelled. The exclusions to whether the policies are designated in force or not in force may include policies that are reissued.

The percentage of policies "in force" may be calculated by dividing the number of policies in force by the total number of policies. The percentage of policies not in force may be calculated by dividing the number of policies not in force by the total number of policies. The persistency score may be calculated based on percentage not inforce, number of policies, and certain weighting factors. (The scores are calculated in the irregular sales activity report.) A report and a file may be created with the above factors, although the data and the file may not be viewable.

In one embodiment, the irregular sales activity monitoring system may include more than two criteria. In one embodiment, for an irregular sales activity monitoring system for an insurance company, a third criteria of internal replacement of accounts may be selected. In this embodiment, the irregular sales activity monitoring system may extract data related to the third predetermined criteria based on a third guideline. The third predetermined criteria may include an internal replacement of accounts criteria. In one embodiment, the internal replacement of accounts criteria may include an internal replacement of insurance policies. The third guideline may be a predetermined time period based on issue date. The predetermined time period may be a one year time frame.

A third criteria specific report may be generated by the irregular sales activity monitoring system. The third criteria specific report may include an internal replacement report.

The internal replacement report may include, for each sales agent, general agent or product, a list of factors related to internal replacements of policies. In one embodiment, the list of factors may include the number of policies without internal replacements the number of policies with internal replacements, the total number of policies, the percentage of polices without internal replacements, and the percentage of policies with internal replacements. The exclusions from designation of without internal replacement and internal replacement may include certain policies that are pending.

The percentage of those policies without internal replacements may be calculated by dividing the number of policies without internal replacements by the total number of policies. The percentage of internal replacement policies may be calculated by dividing the number of policies with internal replacement by the total number of policies. The internal replacement score may be calculated based on the percentage of policies with internal replacements, number of policies, and certain weighting factors (The scores are calculated in the irregular sales activity report.) A report and a file with the above factors may be created, although the data in the file may not be viewable.

In one embodiment, the irregular sales activity monitoring system may include more than two criteria. In one embodiment, for an irregular sales activity monitoring system for an insurance company, a fourth criteria of external replacement of accounts may be selected. In this embodiment, the irregular sales activity monitoring system may extract data related to the fourth predetermined criteria based on a fourth guideline. The fourth predetermined criteria may include an external replacement of accounts criteria. In one embodiment, the external replacement of accounts criteria may include an external replacement of insurance policies. The fourth guideline may be a predetermined time period based on issue date. The predetermined time period may be a one year time frame.

A fourth criteria specific report may be generated by the irregular sales activity monitoring system. The fourth criteria specific report may include an external replacement report.

The external replacement report may include, for each sales agent, general agent or product, a list of factors related to external replacements of policies. In one embodiment, the list of factors may include the number of policies without external replacements the number of policies with external replacements, the total number of policies, the percentage of polices without external replacements, and the percentage of policies with external replacements. The exclusions from designation of without external replacement and external replacement may include certain policies that are pending.

The percentage of those policies without external replacements may be calculated by dividing the number of policies without external replacements by the total number of policies. The percentage of external replacement policies may be calculated by dividing the number of policies with external replacement by the total number of policies. The external replacement score may be calculated based on percentage of policies with external replacements, number of policies, and certain weighting factors.

In one embodiment, the scores for each criteria may be calculated in the irregular sales activity report. A report and a file with the above factors may be created, although the data in the file may not be viewable.

In one embodiment, a fifth criteria may be selected for an irregular sales activity monitoring system for an insurance company. In this embodiment, the irregular sales activity monitoring system may extract data related to the fifth predetermined criteria based on a fifth guideline. The fifth predetermined criteria may include a product mix of accounts criteria. In one embodiment, the product mix of accounts criteria may include a product mix of insurance policies. The fifth guideline may be a predetermined time period based on policy date. The predetermined time period may be a three year time frame.

A fifth criteria specific report may be generated by the irregular sales activity monitoring system. The fifth criteria specific report may include a product mix report. The product mix report may include, for each sales agent, general agent or product, a list of factors related to the product mix of policies. In one embodiment, the list of factors may include the number of cash value policies and deferred annuity contracts, the number of policies that are not cash value policies or deferred annuity contracts, the total number of policies, the percentage of cash value policies or deferred annuity contracts, and the percentage of those policies that aren't cash value policies or deferred annuity contracts. The exclusions from designation of cash value policies and deferred annuity contracts and those that aren't cash value policies or deferred annuity contracts may include certain policies that are pending.

The percentage of those policies that aren't cash value policies or deferred annuity contracts may be calculated by dividing the number of policies that aren't cash value policies or deferred annuity contracts by the total number of policies. The percentage of cash value policies and deferred annuity contracts may be calculated by dividing the number of policies that are cash value policies or deferred annuity contracts by the total number of policies. The product mix score may be calculated based on percentage of cash value policies or deferred annuity contracts, number of policies, and certain weighting factors (The scores are calculated in the irregular sales activity report.) A report and a file with the above factors may be created, although the data in the file may not be viewable.

In one embodiment, a sixth criteria may be selected for an irregular sales activity monitoring system for an insurance company. In this embodiment, the irregular sales activity monitoring system may extract data related to the sixth predetermined criteria based on a sixth guideline. The sixth predetermined criteria may include a customer age mix of accounts criteria. In one embodiment, the customer age of accounts criteria may include a customer age of insurance policies. The sixth guideline may be a predetermined time period based on policy date. The predetermined time period may be a three year time frame.

A sixth criteria specific report may be generated by the irregular sales activity monitoring system. The sixth criteria specific report may include a customer age report.

The customer age report may include, for each sales agent, general agent or product, a list of factors related to the customer age of policies. In one embodiment, the list of factors may include the sum of customer ages on all policies, the total number of policies, and the average customer age. The exclusions from designation of customer age policies may include certain policies that are pending.

The average customer age may be calculated by dividing the sum of the customer ages by the total number of policies. The customer age score may be calculated based on average customer age, number of policies, and certain weighting factors (The scores are calculated in the irregular sales activity report.) A report and a file with the above factors may be created, although the data in the file may not be viewable.

The six criteria are described for illustrative purposes. The irregular activity monitoring system may include any number and type of criteria. The irregular activity monitoring system may be designed to include a greater number of criteria or fewer criteria.

At step 105, the irregular sales activity monitoring system may generate an intermediate report. The intermediate report may include information from the criteria specific reports. In one embodiment, generating the intermediate report may include generating two intermediate reports. The first intermediate report may be generated by reading the placement file, the persistency file, the internal replacement file, the external replacement file, the product mix file, and the customer age file. The first intermediate report may include placement data, persistency data, internal replacement data, external replacement data, product mix data, and customer age data from the six files on one line for each entity, such as agent, general agent, or product. The first intermediate report may be generated by adding all of the data from the first file that is read, such as the placement file, to the first intermediate report file.

The second file that is read may then be checked against the data already entered in the first intermediate report field. If the data read from the second file is already in the first intermediate file, the data from the second file may be added to the same line of data for that entity already in the first intermediate file. If the data from the second file is not already in the first intermediate report file, a new line of data may be added, for the entity, to the intermediate report file. The third file that is read into the first intermediate report file may then be checked against the data already in the first intermediate report file. If the entity being read from the third file is already in the first intermediate report file, the data from the third file may be added to the same line of data as that entity in the first intermediate report file. If the entity being read from the third file is not the first intermediate report file, a new line of data may be added for that entity to the first intermediate report file. The fourth file that is read may then be checked against the data already entered in the first intermediate report field. If the data read from the fourth file is already in the first intermediate file, the data from the fourth file may be added to the same line of data for that entity already in the first intermediate file. If the data from the fourth file is not already in the first intermediate report file, a new line of data may be added, for the entity, to the intermediate report file. The fifth file that is read may then be checked against the data already entered in the first intermediate report field. If the data read from the fifth file is already in the first intermediate file, the data from the fifth file may be added to the same line of data for that entity already in the first intermediate file. If the data from the fifth file is not already in the first intermediate report file, a new line of data may be added, for the entity, to the intermediate report file. The sixth file that is read may then be checked against the data already entered in the first intermediate report field. If the data read from the sixth file is already in the first intermediate file, the data from the sixth file may be added to the same line of data for that entity already in the first intermediate file. If the data from the sixth file is not already in the first intermediate report file, a new line of data may be added, for the entity, to the intermediate report file.

The second intermediate report file may read all of the data from the first intermediate report file as well as read an exclusion table set up for an agent report. The exclusion table may contain one or more agent numbers that have already been reviewed and that should be excluded from the irregular sales activity monitoring report for a certain period of time after the review. The exclusion table may also include agent numbers that have been identified to contain business from multiple agents, and not just as a personal agent number.

At step 106, an irregular sales activity report is generated. The irregular sales activity report may include total policies for each entity. The total policies may be calculated by adding the total placement policies, the total persistency policies, the total internal replacement policies, the total external replacement policies, the total product mix policies, and the total customer age policies. The total score may be calculated by adding the persistency score, the policies not placed score, the external replacement score, the internal replacement score, the product mix score, and the customer age score. Although specific formulas are present for determining the total score, any appropriate formula may be chosen by a system administrator or other user having the authority to choose the formulas. The irregular sales activity report may be generated, including all entities and all scores or including all entities having a total score greater than a selected irregular sales activity signaling score. In one embodiment, the irregular sales activity monitoring system may read the second intermediate report file and create the irregular sales activity report by computing individual criteria scores, total scores, and by listing all of the agents, general agents, or products having a total score of greater than a selected irregular sales activity signaling score or listing all scores, if so chosen. For example, an irregular sales activity report can be generated listing all of the agents, general agents, or products having a total score of greater than 10 and listing those entities in descending score order. An irregular sales activity monitoring report may also include a total of a plurality of a persistency policies, a total persistency score, a total of placement policies, a total placement score, a total of external replacement policies, an external replacement score, a total of internal replacement policies, an internal replacement score, a total of product mix policies, a product mix score, a total of customer age policies, a customer age score, a total number of policies and the total score.

In one embodiment, a summary report may also be printed showing the total number of agents, general agents or products, the average number of persistency policies, the average persistency score, the average number of placement policies, the average placement score, average number of external replacement policies, average external replacement score, average number of internal replacement policies, average internal replacement score, average number of product mix policies, the average product mix score, average customer age, the average customer age score, average total number of all policies and average total score. In one embodiment, the irregular sales activity signaling score may be selected based on the summary report so that the irregular sales activity report is generated after the summary report.

The average number of persistency policies may be calculated by adding the total number of persistency policies together and dividing the total number of persistency policies by the total number of agents, general agents or products. The average persistency score may be calculated by adding all of the persistency scores and dividing the sum of the persistency scores by the total number of agents, general agents or products. The average number of placement policies may be determined by adding together the total number of placement policies and dividing the total number of placement policies by the total number of agents, general agents or products.

The average placement score may be calculated by adding together all of the placement scores and dividing the sum of the placement scores by the total number of agents, general agents or products. The average number of internal replacement policies may be calculated by adding together the total number of internal replacement policies and dividing the total number of replacement policies by the total number of agents, general agents or products.

The average internal replacement score may be determined by adding together all of the internal replacement scores and dividing the sum of the internal replacement scores by the total number of agents, general agents or products. The average number of external replacement policies may be calculated by adding together the total number of external replacement policies and dividing the total number of replacement policies by the total number of agents, general agents or products.

The average external replacement score may be calculated by adding together the external replacement scores and dividing the sum of the external replacement scores by the total number of agents, general agents or products.

The average product mix score may be calculated by adding together the product mix scores and dividing the sum of the product mix scores by the total number of agents, general agents or products. The average customer age score may be calculated by adding together the customer age scores and dividing the sum of the customer age scores by the total number of agents, general agents or products.

The average total number of all policies may be calculated by adding together the totals of all the policies and dividing the sum of the total of all policies by the total number of agents, general agents or products. The average total score may be determined by adding together all of the total scores and dividing the sum of the total scores by the total number of agents, general agents or products.

Figure 2:
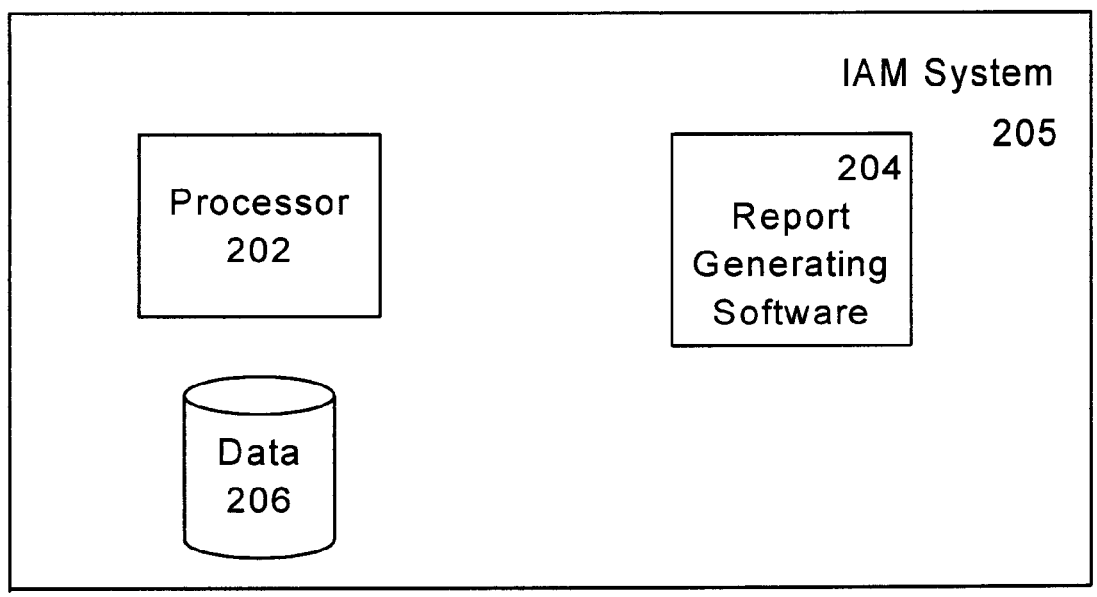
FIG. 2 is a block diagram illustrating one embodiment of a system for monitoring irregular sales activity.

FIG. 2 is a block diagram illustrating one embodiment of the irregular sales activity monitoring system. In the embodiment shown, the irregular sales activity monitoring ("IAM") system 205 includes a processor 202, a report generating software module 204 and a database 206. In one embodiment, the report generating software module 204 includes instructions to perform the method described above with reference to FIG. 1.

The processor 202 may execute instructions of the report generating software module 204. For example, the processor 202 may receive instructions from the report generating software module 204 to perform the steps described above with reference to FIG. 1.

The database 206 may be used to store the data files, reports, report generating templates and any other type of data required to perform the irregular sales activity monitoring method as described above with reference to FIG. 1.

Figure 3:
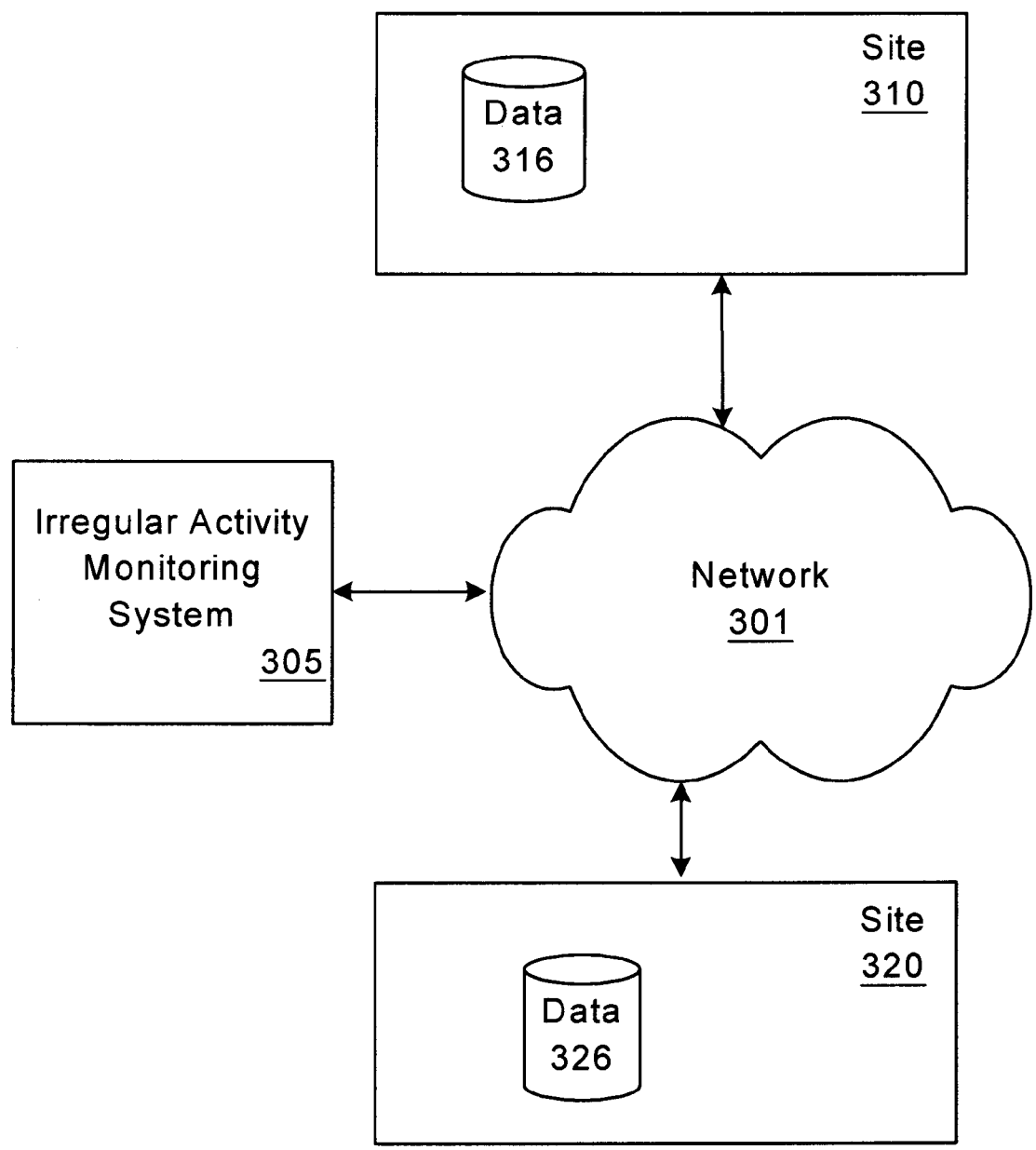
FIG. 3 is a block diagram illustrating a second embodiment for a system for monitoring irregular sales activity.

The database 206 may include or interface to an Oracle™ relational database sold commercially by Oracle Corporation. Other databases may also be used, such as, for example, an Informix™ database, a Database 2 (DB2) database, a Sybase database or other data storage or query formats, platforms or resources such as an On Line Analytical Processing (OLAP) database, a Standard Query Language (SQL) database, a storage area network (SAN), or a Microsoft Access™ database. FIG. 3 is a block diagram illustrating a second embodiment of the IAM system 305. In the embodiment shown in FIG. 3, the IAM system 305 may be a part of a network or may be located at a site that is a part of a network 301. The network 301 may include a communications link. The communications link 301 may include or interface to any one or more of the Internet, an intranet, a Personal Area Network (PAN), a Local Area Network (LAN), a Wide Area Network (WAN), or a Metropolitan Area Network (MAN), a storage area network (SAN), a frame relay connection, an Advanced Intelligent Network (AIN) connection, a synchronous optical network (SONET) connection, a digital T1, T3, E1 or E3 line, a Digital Data Service (DDS) connection, a Digital Subscriber Line (DSL) connection, an Ethernet connection, an Integrated Services Digital Network (ISDN) line, a dial-up port such as a V.90, a V.34 or a V.34bis analog modem connection, a cable modem, an Asynchronous Transfer Mode (ATM) connection, a Fiber Distributed Data Interface (FDDI) or a Copper Distributed Data Interface (CDDI) connection. The communications link 301 may also include or interface to any one or more of a Wireless Application Protocol (WAP) link, a General Packet Radio Service (GPRS) link, a Global System for Mobile Communication (GSM) link, a Code Division Multiple Access (CDMA) or a Time Division Multiple Access (TDMA) link such as a cellular phone channel, a Global Positioning System (GPS) link, a cellular digital packet data (CDPD) link, a Research in Motion, Limited (RIM) duplex paging type device, a Bluetooth radio link, or an IEEE 802.11-based radio frequency link. The Communications link 301 may also include or interface to any one or more of an RS-232 serial connection, an IEEE-1394 (Firewire) connection, a Fibre Channel connection, an infrared IrDA) port, a Small Computer Systems Interface (SCSI) connection, a Universal Serial Bus (USB) connection or another wired or wireless, digital or analog interface or connection.

In one embodiment, the IAM system 305 may be in a remote location from the databases storing the predetermined set of files described above with reference to FIG. 1. For example, the IAM system 305 may extract data from one or more predetermined files stored at sites 310 and 320. The predetermined files stored at site 310 may be stored in database(s) 316 of site 310 and the predetermined files stored at site 320 may be stored in database(s) 326 of site 320.

In one embodiment, the IAM system 305 may reside at one of the sites 310 or 320. Although only two sites, 310, 320 are shown, there may be as more or fewer sites 310, 320 on network 301. For example, there may be as few as one site, on which the IAM system 305 resides, or as many sites as necessary or desired by the network designer or other user of the network 301.

While the foregoing description includes many details and specificities, it is to be understood that these have been included for purposes of explanation only, and are not to be interpreted as limitations of the present invention. Many modifications to the embodiments described above can be made without departing from the spirit and scope of the invention, as is intended to be encompassed by the following claims and their legal equivalents.

What is claimed is:

1. A method for identifying irregular sales activity using a computer system and a plurality of criteria, the method comprising the steps of:
   extracting data related to a first predetermined criteria from at least one of a predetermined set of files based on a first guideline, wherein
      the predetermined set of files are stored in a storage means in the computer system, and
      the first predetermined criteria includes placement of accounts criteria for detection of irregular sales activity;
   generating a first criteria specific report using a report generating module based on the first predetermined criteria including data related to the first predetermined criteria associated with one or more entities of at least one predetermined entity type, wherein the at least one predetermined entity type comprises at least one of an agent, a general agent and a product, or other selected entities;
   extracting data related to a second predetermined criteria from at least one of the predetermined set of files based on a second guideline, wherein the second predetermined criteria includes persistency of accounts criteria for detection of irregular sales activity;
   generating a second criteria specific report using the report generating module based on the second predetermined criteria including data related to the second predetermined criteria associated with the one or more entities;
   generating at least one intermediate report using the report generating module including information from the first and the second criteria specific reports; and
   generating an irregular sales activity report using the report generating module by generating a first criteria score based on irregular sales activity related to the first predetermined criteria, the first criteria score calculated using a first predetermined formula, and a second criteria score based on irregular activity related to the second predetermined criteria, the second criteria score calculated using a second predetermined formula, the irregular sales activity report listing at least one of all of the entities having a total score greater than a selected irregular sales activity signaling score and all scores.

2. The method of claim 1 wherein the step of generating the first criteria specific report comprises sorting, for each entity, the extracted data related to the placement of accounts into a plurality of categories including a number of accounts placed category, a number of accounts not placed category and a total number of accounts category, and calculating, for each entity, the percentage of accounts placed and the percentage of accounts not placed.

3. The method of claim 1 wherein the step of generating the second report includes the sub-steps of sorting, for each entity, the extracted data related to the persistency of accounts into a plurality of categories including a number of accounts in force category, a number of accounts not in force category and a total number of accounts category, and calculating, for each entity, the percentage of accounts in force and the percentage of accounts not in force.

4. The method of claim 1 further comprising the steps of:
   extracting data related to a third predetermined criteria from at least one of a predetermined set of files based on a third guideline; and generating a third criteria specific report based on the third predetermined criteria including data related to the third predetermined criteria associated with one or more entities of at least one predetermined entity type;

wherein generating the irregular sales activity report further comprises generating a third criteria score based on irregular sales activity related to the third predetermined criteria, the third criteria score calculated using a third predetermined formula.

5. The method of claim 4 wherein the third predetermined criteria includes an internal replacement of accounts criteria and the step of generating the third report includes the sub-steps of sorting the extracted data related to the internal replacement of accounts, for each entity, into a plurality of categories including a number of accounts with internal replacement category, a number of accounts without internal replacement category and a total number of accounts category, and calculating, for each entity, the percentage of accounts with internal replacement and the percentage of accounts without internal replacement.

6. The method of claim 4 wherein the step of calculating the third criteria score using the third predetermined formula comprises calculating an internal replacement of accounts score using an internal replacement of accounts formula, the internal replacement of accounts formula based on at least one of a percentage of internal replacement policies not in force, number of policies, and other weighted factors associated with internal replacement of accounts.

7. The method of claim 1 further comprising the steps of:
extracting data related to a fourth predetermined criteria from at least one of a predetermined set of files based on a fourth guideline;

generating a fourth criteria specific report based on the fourth predetermined criteria including data related to the fourth predetermined criteria associated with one or more entities of at least one predetermined entity type;

wherein generating the irregular sales activity report further comprises generating a fourth criteria score based on irregular activity related to the fourth predetermined criteria, the fourth criteria score calculated using a fourth predetermined formula.

8. The method of claim 7 wherein the fourth predetermined criteria includes an external replacement of accounts criteria and the step of generating the fourth report includes the sub-steps of sorting, for each entity, the extracted data related to the external replacement of accounts into a plurality of categories including a number of accounts with external replacement category, a number of accounts without external replacement category and a total number of accounts category, and calculating, for each entity, the percentage of accounts with external replacement and the percentage of accounts without external replacement.

9. The method of claim 7 wherein the step of calculating the fourth criteria score using the fourth predetermined formula comprises calculating an external replacement of accounts score using an external replacement of accounts formula, the external replacement of accounts formula based on at least one of a percentage of external replacement policies not in force and other weighted factors associated with external replacement of accounts.

10. The method of claim 1 further comprising the steps of:
extracting data related to a fifth predetermined criteria from at least one of a predetermined set of files based on a fifth guideline;

generating a fifth criteria specific report based on the fifth predetermined criteria including data related to the fifth predetermined criteria associated with one or more entities of at least one predetermined entity type wherein generating the irregular sales activity report further comprises generating a fifth criteria score based on irregular sales activity related to the fifth predetermined criteria, the fifth criteria score calculated using a fifth predetermined formula.

11. The method of claim 10 further wherein the fifth predetermined criteria includes a product mix of accounts criteria and the step of generating the fifth report includes the sub-steps of sorting, for each entity, the extracted data related to the product mix of accounts into a plurality of categories including a number of cash value and deferred annuity accounts category, a number of accounts not cash value and deferred annuity category and a total number of accounts category, and calculating, for each entity, the percentage of cash value and deferred annuity accounts and the percentage of accounts not cash value and deferred annuity.

12. The method of claim 10 wherein the step of calculating the fifth criteria score using the fifth predetermined formula comprises calculating a product mix of accounts score using a product mix of accounts formula, the product mix of accounts formula based on at least one of percentage of cash value policies, percentage of deferred annuity contracts, number of policies, and other weighted factors associated with product mix of accounts.

13. The method of claim 1 further comprising the steps of:
extracting data related to a sixth predetermined criteria from at least one of a predetermined set of files based on a sixth guideline; and generating a sixth criteria specific report based on the sixth predetermined criteria including data related to the sixth predetermined criteria associated with one or more entities of at least one predetermined entity type, wherein generating the irregular sales activity report further comprises generating a sixth criteria score based on irregular activity related to the sixth predetermined criteria, the sixth criteria score calculated using a sixth predetermined formula.

14. The method of claim 13 wherein the sixth predetermined criteria includes a customer age of accounts criteria and the step of generating the sixth report includes the sub-steps of sorting, for each entity, the extracted data related to the customer age of accounts into a plurality of categories including the sum of the ages on all accounts, a total number of accounts category, and an average age for all accounts.

15. The method of claim 13 wherein the step of calculating the sixth criteria score using the sixth predetermined formula comprises calculating a customer age of accounts score using a customer age of accounts formula, the customer age of accounts formula based on at least one of average customer age, number of policies, and other weighted factors associated with customer age of accounts.

16. The method of claim 1 wherein the step of calculating the first criteria score using the first predetermined formula comprises calculating the first criteria score based on at least one of percentage of activity not placed, number of policies, and other weighted factors associated with activity not placed; and the step of calculating the second criteria score using the second predetermined formula comprises calculating a persistency score using a persistency formula, the persistency formula based on percentage of activity not placed, number of policies, and other weighted factors associated with persistency.

17. The method of claim 3 further comprising the step of calculating a total number of accounts for the irregular sales activity report, the total number of accounts for the irregular sales activity report including a sum of the total number of accounts from each of the criteria specific reports.

18. The method of claim 1 further comprising the step of selecting the selected irregular sales activity signaling score by performing a preliminary scan of a sample set of the predetermined set of files.

19. The method of claim 1 wherein the selected irregular sales activity signaling score is a predetermined irregular sales activity signaling score.

20. The method of claim 1 wherein the step of generating the intermediate report includes the sub-steps of:

generating a first intermediate report including information from the criteria specific reports; and generating a second intermediate report including contents of the first intermediate report, an exclusion table listing entities of at least one entity type that should be excluded from the irregular sales activity report.

21. The method of claim 1 further comprising the step of calculating the total score by summing all of the criteria scores.

22. The method of claim 1 further comprising the step of calculating, for the irregular sales activity report, at least one of a total number of entity accounts for the irregular sales activity report, the average number of accounts for each criteria, the average score for each criteria, the average total number of accounts and the average total score, wherein the total number of entity accounts is calculated by applying a predetermined formula to the total number of accounts from the criteria specific reports, and wherein the average number of accounts for each criteria is calculated by dividing the total number of accounts for each criteria by the number of entities, and wherein the average score for each criteria is calculated by dividing the sum of all of the criteria scores in each criteria specific report by the number of entities, and wherein the average total number of accounts is calculated by dividing the sum of all of the total number of entity accounts for all of the entities from the irregular sales activity report by the number of entities, and wherein the average total score is calculated by dividing the sum of all of the total scores for all of the entities from the irregular sales activity report by the number of entities.

23. The method of claim 1 wherein the predetermined set of files is stored in at least one database.

24. The method of claim 1 wherein the predetermined set of files includes pending files and purged files.

25. The method of claim 1 further comprising the steps of extracting data for each of a plurality of criteria from the predetermined set of files; and generating a criteria specific report for each of the plurality of criteria.

26. The method of claim 25 further comprising the step of selecting the plurality of criteria.

27. A system for identifying irregular sales activity using a computer and a plurality of criteria, comprising:

first data extracting means for extracting data related to a first predetermined criteria for detection of irregular sales activity from at least one of a predetermined set of files stored in said computer based on a first guideline;

first generating means for generating a first criteria specific report based on the first predetermined criteria including data related to the first predetermined criteria associated with one or more entities of at least one predetermined entity type and a first criteria score based on irregular sales activity related to the first predetermined criteria, the first criteria score calculated using a first predetermined formula;

second data extracting means for extracting data related to a second predetermined criteria for detection of irregular sales activity from at least one of the predetermined set of files based on a second guideline; and second generating means for generating a second criteria specific report based on the second predetermined criteria including data related to the second predetermined criteria associated with the one or more entities and a second criteria score based on irregular sales activity related to the second predetermined criteria, the second criteria score calculated using a second predetermined formula;

third generating means for generating an intermediate report including information from the criteria specific reports and fourth generating means for generating an irregular activity report calculating criteria scores based on percentage of criteria activity, number of policies, and other weighted factors, listing all of the entities, or listing all of the entities having a total score greater than a selected irregular sales activity signaling score.

28. The system of claim 27 further comprising:

third extracting means for extracting data related to a third predetermined criteria from at least one of the predetermined set of files based on a third guideline; and fifth generating means for generating a third criteria specific report based on the third predetermined criteria including data related to the third predetermined criteria associated with the one or more entities and a third criteria score based on irregular sales activity related to the third predetermined criteria.

29. The system of claim 28 wherein the third predetermined criteria includes a internal replacement of accounts criteria and wherein the fifth generating means includes sorting means, for each entity, for sorting the extracted data related to the internal replacement of accounts criteria into a plurality of categories including a number of accounts without internal replacement category, a number of accounts with internal replacement category, and a total number of accounts; and calculating means, for each entity, for calculating a percentage of accounts without internal replacement, a percentage of accounts with internal replacement.

30. The system of claim 29 wherein the first predetermined criteria includes a placement of accounts criteria, the second predetermined criteria includes a persistency of accounts criteria, the third predetermined criteria includes an internal replacement of accounts criteria, the fourth predetermined criteria includes an external replacement of accounts criteria, the fifth predetermined criteria includes a product mix accounts criteria, and the sixth predetermined criteria includes a customer age accounts criteria, and wherein the first generating means includes sorting means, for each entity, for sorting the extracted data related to the placement of accounts into a plurality of categories including a number of accounts placed category, a number of accounts not placed category and a total number of accounts category, and calculating means, for each entity, for calculating the percentage of accounts placed and the percentage of accounts not placed, and wherein the second generating means includes sorting means, for each entity, for sorting the extracted data related to the persistency of accounts into a plurality of categories including a number of accounts in force category, a number of accounts not in force category and a total number of accounts category, and calculating means, for each entity, for calculating the percentage of accounts in force and the percentage of accounts not in force, and wherein the third generating means includes sorting means, for each entity, for sorting the extracted data related to the internal replacement of accounts into a plurality of categories including a number of accounts with internal replacements, a number of accounts without internal replacements, and a total number of accounts category, and calculating means, for each entity, for calculating the percentage of accounts with internal replacements and the percentage of accounts without internal replacements, and wherein the fourth generating means includes sorting means, for each entity, for sorting the extracted data related to the external replacement of accounts into a plurality of categories including a number of accounts with external replacements, a number of accounts without external replacement and a total number of accounts category, and calculating means, for each entity, for calculating the percentage of accounts with external replacements and the percentage of accounts without external replacements, and wherein the fifth generating means includes sorting means, for each entity, for sorting the extracted data related to the product mix of accounts into a plurality of categories including a number of accounts with cash value policies or deferred annuity contracts category, a number of accounts not cash value policies or deferred annuity contracts category and a total number of accounts category, and calculating means, for each entity, for calculating the percentage of accounts with cash value policies or deferred annuity contracts and the percentage of accounts not cash value policies or deferred annuity contracts, and wherein the sixth generating means includes sorting means, for each entity, for sorting the extracted data related to the customer age of accounts into a plurality of categories including the sum of the ages on all accounts, a total number of accounts category, and an average age for all accounts.

31. The system of claim 30 wherein the first calculating means includes calculating means for calculating a placement score based on percentage of activity not placed, number of policies, and other weighted factors, and wherein the calculating means for calculating the second criteria score using the second predetermined formula includes calculating means for calculating a persistency score using a persistency formula, the persistency formula obtained by calculating a persistency score based on percentage of activity not placed, number of policies, and other weighted factors.

32. The system of claim 30 further comprising calculating means for calculating a total number of accounts for the irregular sates activity report, the total number of accounts for the irregular sales activity report including a sum of the total number of accounts from the placement report, the total number of accounts from the persistency report, the total number of accounts from the internal replacement report, the total number of accounts from the external replacement report, the total number of accounts from the product mix report, and the total number of accounts from the customer age report.

33. The system of claim 27 further comprising selecting means for selecting the irregular sales activity signaling score obtained by performing a preliminary scan of a sample set of the predetermined set of files.

34. The system of claim 27 wherein the third generating means includes
generating means for generating a first intermediate report including information from the criteria specific reports; and
generating means for generating a second intermediate report including contents of the first intermediate report, an exclusion table listing one or more entities of at least one entity type that should be excluded from the irregular sales activity report and the number of total accounts.

35. The system of claim 27 further comprising calculating means for calculating a total score by summing all of the criteria scores (or other formula for aggregating all of the criteria scores).

36. The system of claim 27 further comprising calculating means, for calculating the irregular sales activity report, at least one of a total number of entity accounts for the irregular sales activity report, the average number of accounts for each criteria, the average score for each criteria, the average total number of accounts and the average total score,
wherein the total number of entity accounts is calculated by applying a predetermined formula to the total number of accounts from the criteria specific reports,
and wherein the average number of accounts for each criteria is calculated by dividing the total number of accounts for each criteria by the number of entities,
and wherein the average score for each criteria is calculated by dividing the sum of all of the criteria scores in each criteria specific report by the number of entities,
and wherein the average total number of accounts is calculated by dividing the sum of all of the total number of entity accounts for all of the entities from the irregular activity report by the number of entities, and
wherein the average total score is calculated by dividing the sum of all of the total scores for all of the entities from the irregular sales activity report by the number of entities.

37. The system of claim 27 further comprising data extracting means for extracting data for each of a plurality of criteria from the predetermined set of files and generating means for generating a criteria specific report for each of the plurality of criteria.

38. The system of claim 27 further comprising selecting means for selecting the plurality of criteria.

39. A method for identifying irregular sales activity using a computer and a plurality of criteria, comprising the steps of;
extracting data related to a first predetermined criteria for detection of irregular sales activity from at least one of a predetermined set of files stored in said computer based on a first guideline;
generating a first criteria specific report based on the first predetermined criteria including data related to the first predetermined criteria associated with one or more entities of at least one predetermined entity type;
extracting data related to a second predetermined criteria for detection of irregular sales activity from at least one of the predetermined set of files based on a second guideline;

generating a second criteria specific report based on the second predetermined criteria including data related to the second predetermined criteria associated with the one or more entities;

generating an intermediate report including information from the criteria specific reports;

extracting data related to a third predetermined criteria for detection of irregular sales activity from at least one of a predetermined set of files based on a third guideline;

generating a third criteria specific report based on the third predetermined criteria including data related to the third predetermined criteria associated with one or more entities of at least one predetermined entity type extracting data related to a fourth predetermined criteria for detection of irregular sales activity from at least one of a predetermined set of files based on a fourth guideline;

generating a fourth criteria specific report based on the fourth predetermined criteria including data related to the fourth predetermined criteria associated with one or more entities of at least one predetermined entity type extracting data related to a fifth predetermined criteria for detection of irregular sales activity from at least one of a predetermined set of files based on a fifth guideline;

generating a fifth criteria specific report based on the fifth predetermined criteria including data related to the fifth predetermined criteria associated with one or more entities of at least one predetermined entity type extracting data related to a sixth predetermined criteria for detection of irregular sales activity from at least one of a predetermined set of files based on a sixth guideline; and generating a sixth criteria specific report based on the first predetermined criteria including data related to the sixth predetermined criteria associated with one or more entities of at least one predetermined entity type; and generating an irregular sales activity report by generating a first criteria score based on irregular sales activity related to the first predetermined criteria, the first criteria score calculated using a first predetermined formula, and a second criteria score based on irregular activity related to the second predetermined criteria, the second criteria score calculated using a second predetermined formula, generating a third criteria score based on irregular sales activity related to the third predetermined criteria, the third criteria score calculated using a third predetermined formula, and a fourth criteria score based on irregular activity related to the fourth predetermined criteria, the fourth criteria score calculated using a fourth predetermined formula, and a fifth criteria score based on irregular sales activity related to the fifth predetermined criteria, the fifth criteria score calculated using a fifth predetermined formula, and a sixth criteria score based on irregular activity related to the sixth predetermined criteria, the sixth criteria score calculated using a sixth predetermined formula the irregular sales activity report, and listing at least one of all of the entities having a total score greater than a selected irregular sales activity signaling score and listing all scores.

40. The method of claim 39 wherein the first predetermined criteria includes placement of accounts and the step of generating the first criteria specific report comprises sorting, for each entity, the extracted data related to the placement of accounts into a plurality of categories including a number of accounts placed category, a number of accounts not placed category and a total number of accounts category, and calculating, for each entity, the percentage of accounts placed and the percentage of accounts not placed;

the second predetermined criteria includes a persistency of accounts criteria and the step of generating the second report includes the sub-steps of sorting, for each entity, the extracted data related to the persistency of accounts into a plurality of categories including a number of accounts in force category, a number of accounts not in force category and a total number of accounts category, and calculating, for each entity, the percentage of accounts in force and the percentage of accounts not in force;

the third predetermined criteria includes an internal replacement of accounts criteria and the step of generating the third report includes the sub-steps of sorting the extracted data related to the internal replacement of accounts, for each entity, into a plurality of categories including a number of accounts with internal replacement category, a number of accounts without internal replacement category and a total number of accounts category, and calculating, for each entity, the percentage of accounts with internal replacement and the percentage of accounts without internal replacement;

the fourth predetermined criteria includes an external replacement of accounts criteria and the step of generating the fourth report includes the sub-steps of sorting, for each entity, the extracted data related to the external replacement of accounts into a plurality of categories including a number of accounts with external replacement category, a number of accounts without external replacement category and a total number of accounts category, and calculating, for each entity, the percentage of accounts with external replacement and the percentage of accounts without external replacement;

the fifth predetermined criteria includes a product mix of accounts criteria and the step of generating the fifth report includes the sub-steps of sorting, for each entity, the extracted data related to the product mix of accounts into a plurality of categories including a number of cash value and deferred annuity accounts category, a number of accounts not cash value and deferred annuity category and a total number of accounts category, and calculating, for each entity, the percentage of cash value and deferred annuity accounts and the percentage of accounts not cash value and deferred annuity; and the sixth predetermined criteria includes a customer age of accounts criteria and the step of generating the sixth report includes the sub-steps of sorting, for each entity, the extracted data related to the customer age of accounts into a plurality of categories including the sum of the ages on all accounts, a total number of accounts category, and an average age for all accounts.

41. The method of claim 39 wherein the first guideline includes a first predetermined time period based on a last change date of the accounts in the predetermined set of files, and wherein the second guideline includes a second predetermined time period based on a policy date of the accounts in the predetermined set of files, and wherein the third guideline includes a third predetermined time period based on an issue date of the accounts in the predetermined set of files, and wherein the third guideline includes a third predetermined time period based on an issue date of the accounts in the predetermined set of files, and wherein the fourth guideline includes a fourth predetermined time period based on an issue date of the accounts in the predetermined set of files, and wherein the fifth guideline includes a fifth predetermined time period based on an policy date of the accounts in the predetermined set of files, and wherein the sixth guideline includes a sixth predetermined time period based on an policy date of the accounts in the predetermined set of files.

42. A system for monitoring irregular activity using a computer and a plurality of criteria, comprising:

a report generating software module for generating a first report based on a first predetermined criteria for detection of irregular activity, a second report based on a second predetermined criteria for detection of irregular sales activity, an intermediate report for aggregating the first report and the second report, and an irregular activity monitoring report assigning a score for each criteria and a total score and listing each entity of the group or listing each entity of the group of entities having a total score greater than a selected irregular activity signaling score wherein the irregular activity monitoring report is further generated by generating a first criteria score based on irregular sales activity related to a first predetermined criteria, the first criteria score calculated using a first predetermined formula, and a second criteria score based on irregular activity related to a second predetermined criteria, the second criteria score calculated using a second predetermined formula;

a processor for executing instructions of the report generating software module; and a database for storing at least one of data associated with the first report, data associated with the second report, formulas for generating the first score, the second score and the total score, and the selected irregular activity signaling score.

43. The system of claim 42 further comprising a second database storing reporting data used to generate the first report and the second report, wherein data for generating the first report and the second report is extracted from the reporting data.

44. The system of claim 43 wherein the second database comprises a first site database and a second site database, the first site database residing on a first site and the second site database residing on a second site, wherein the first and second site are remote from the report generating software module.

45. The system of claim 44 wherein the first site, the second site and the report generating software module are connected to each other through a network.

* * * * *